June 18, 1957 A. S. FITZGERALD 2,796,537
MAGNETIC-AMPLIFIER BINARY COUNTING SYSTEM
Filed Sept. 28, 1953 3 Sheets-Sheet 1

INVENTOR.
ALAN S. FITZ GERALD
BY
ATTORNEYS

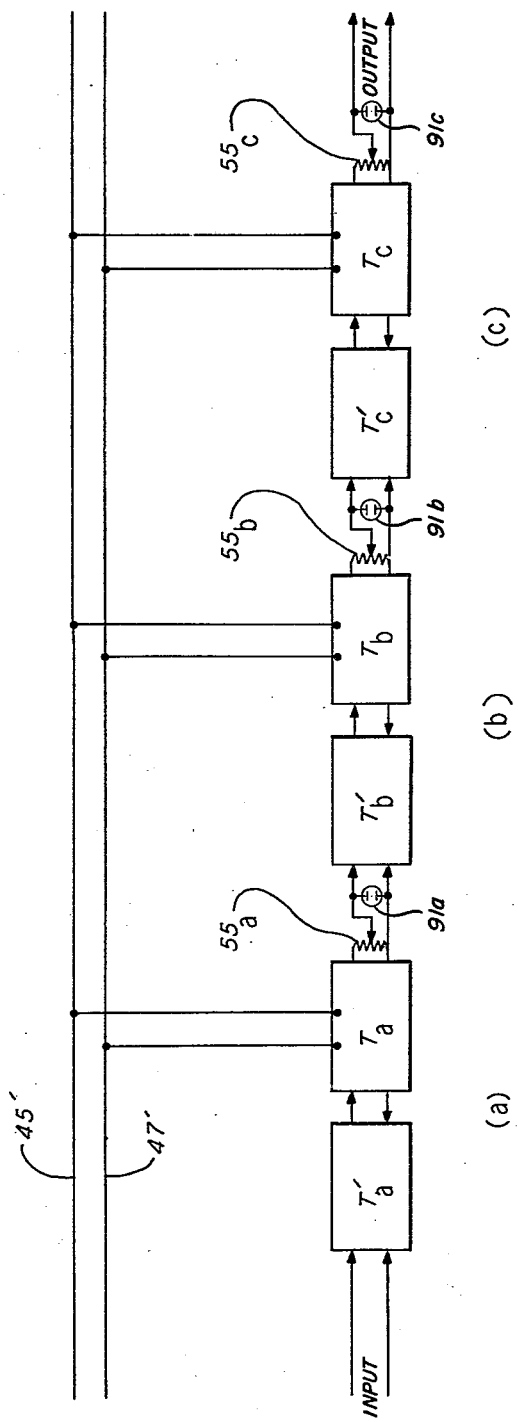

United States Patent Office 2,796,537
Patented June 18, 1957

2,796,537
MAGNETIC-AMPLIFIER BINARY COUNTING SYSTEM

Alan S. FitzGerald, San Francisco, Calif., assignor to Beckman Instruments Inc., South Pasadena, Calif., a corporation of California Application September 28, 1953, Serial No. 382,692

6 Claims. (Cl. 307—88)

This application relates to binary counters adapted for counting, electrically, events which can be translated as electrical impulses of various types and particularly to such counters which may be connected in cascade so as to be able to count and, further, to "remember" such impulses. Counters or scaling circuits of this type are used not only for mere counting but also as elements in computers, which may be more or less elaborate. While the specific arrangement herein described relates primarily to counters employing amplifiers of the magnetic type, the principle employed is a broader one, which may be used in connection with other types of devices which are characterized by the fact that they have two stable states of operation, either of which may be assumed and maintained by the device under the same conditions of input and without change in the circuit elements or connections.

Devices of the class mentioned, i. e. those which have two stable states, are sometimes referred to as "toggles" because of their direct analogy to the mechanical device so termed. The type form of the mechanical device referred to is a lever or a link which is pivoted at one end and is provided with stops so that its motion is limited to the angle at the pivot defined between such stops. To the lever is connected a spring having one end secured to a point on the line bisecting, at least approximately, the angle between the stops. Assuming the spring to be a tension spring, secured behind the pivot of the lever as viewed from the stops, this spring will have its greatest elongation when the lever itself is halfway between them, and in this position the lever will be unstable, "flipping" or "flopping" to one stop or the other depending on any minor factor upsetting its equilibrium and being retained in this position by the spring. When in one position or the other a definite force must be applied to cause the toggle to assume the second position.

A typical electrical circuit exhibiting such a toggle action is the bistable multivibrator. Such circuits have been used in counters of many forms and are quite conventional and thoroughly understood. When so used, however, it is necessary for many purposes that they be combined with some means which will make the same type of signal cause a reversal of state, irrespective of which state exists at the instant the signal is applied. There is some laxity in the use of the terms which are applied to such circuits at the present time. In this specification, however, the term "electrical toggle" or "toggle" will be employed to describe the bistable mechanism itself, while the term "flip-flop" may be used to designate a bistable instrumentality plus the agency whereby the same type of input signal causes the reversal of state in either direction.

Using this terminology, the device of the present invention is a flip-flop, comprised of two toggles. One of these toggles is constantly excited, whereas the second is excited only intermittently, the periods of excitation comprising the events to be counted. The toggles are cross coupled, but to different degrees, the permanently excited toggle being controlled by the intermittently excited one to an extent such that the latter, when it trips, will, in tripping, force a change of state in the permanently excited toggle. The back coupling from the permanently excited to the intermittently excited toggle is not sufficiently close to cause it to change its state while it is excited. When the excitation is interrupted, however, the bias supplied by the back coupling is sufficient to determine which state it will assume when excitation is reapplied. When this occurs, therefore, it assumes the state opposite to that existing during its last previous excitation and in so doing trips the constantly excited toggle, preparing the intermittently excited one to change state again upon the next interruption and reapplication of energy.

Where the electrical toggles are in the form of magnetic amplifiers such, for example, as those described in prior Patent Number 2,027,312 of the present inventor, this arrangement has particular advantages. In this case the events to be counted can be trains of alternating current waves of substantially any frequency, depending upon the magnetic and electric design of the feedback amplifier used. The output of amplifiers of this type can either be alternating or direct current; connecting the devices to give an alternating output, they can be connected in cascade, minimum output representing, for example "0" for each stage, and finite output representing "1." The output for each stage of such a cascade arrangement is therefore of the proper type to be counted by a succeeding stage. Furthermore, as is brought out in the prior patent above mentioned, owing to the retentivity of the cores of the electrical toggles, considered singly, if excitation is wholly withdrawn from both the continuously and intermittently excited toggles, upon reapplication of such energization each will reassume the same state as was exhibited by it when the supply was interrupted. A chain of such devices therefore becomes a magnetic memory; data in the form of binary numbers can be fed into such a chain and will be retained thereby indefinitely without the necessity of maintaining the device constantly excited.

From the above it will be appreciated among the objects of the invention are to provide a type of electrical counting stage which is extremely positive in its action with regard to reversal of state; to provide a type of counting circuit which may be cascaded indefinitely; to provide a type of counting circuit which is particularly adapted to the use of the magnetic type of amplifier; to provide a counting circuit which is capable of acting as a magnetic memory without the necessity of continuous energization between the periods of actual use; to provide a type of counter which, with proper precautions as to design and frequency of supply, can count events having very high recurrence rates, even up to the range of hundreds of kilocycles per second as supplied to the initial stage; and to provide a method of operation of binary counters which, while primarily adapted to counters of the magnetic type, is applicable generally.

All of the above, together with other features not specifically there stated, will become more readily understandable by reference to the following detailed explanation, taken in connection with the accompanying drawings wherein:

Fig. 5 is a block diagram of a binary counting or scaling circuit employing a plurality of stages in cascade.

Figure 1:
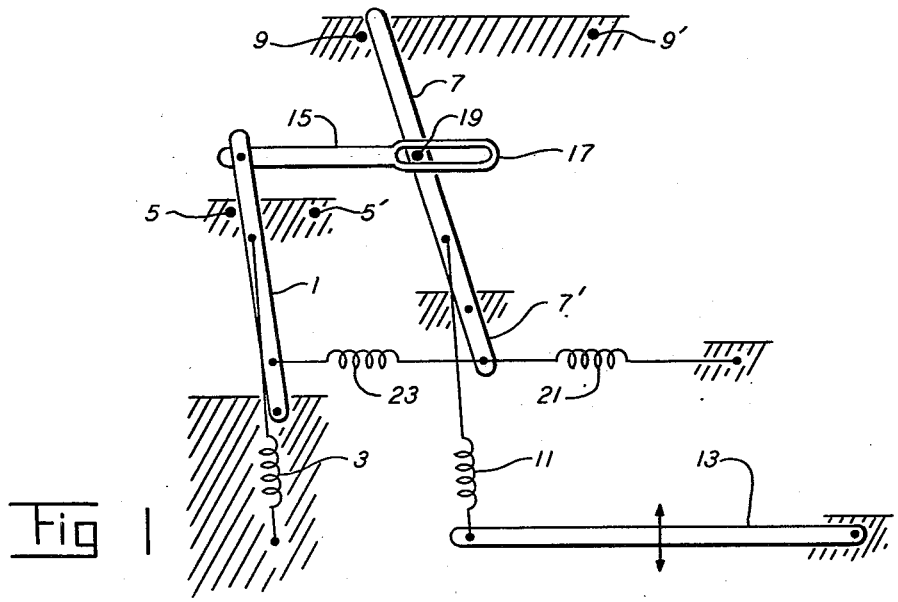
Fig. 1 is a diagram of a mechanical analogue of the present invention.

Referring first to Fig. 1, this illustrates a mechanical analogue of the counting circuit of this invention. A first toggle lever 1 is continuously biased by a tension spring 3 which tends to hold it against either a stop 5 or a stop 5', the lever 1 and the spring 3 both being secured to the same support and the stops 5 and 5' also being fixed in position. A second toggle lever 7, also pivoted on a fixed support, operates between stops 9 and 9'. The toggle spring 11, serving to hold the lever 7 against one or the other of its stops, is not, however, fixed at its opposite end, but is secured instead to a lever 13. When moved upward lever 13 fully relaxes the spring 11, but when moved downward it applies tension to the spring so as to hold the lever in one of its two positions or "stable states."

The two toggles thus described are cross coupled in two different manners. A link 15, pivoted to the end of the lever 1, has a looped end 17 encircling a pin 19 on the lever 7. The length of the loop is so proportioned that when the lever 7 is against either pin it forces the lever 1 past center, thus causing the spring 3 to throw the lever 1 the rest of the way against the corresponding pin 5 or 5', and the spring 11 has sufficient strength so that when it is tensed it will overcome the action of spring 3 and cause lever 1 to slant in the same direction as lever 7. The loop 17 permits this additional motion of lever 7.

The second cross coupling is of a different character. An extension 7' of the lever 7 is connected between a fixed spring 21 and a second spring 23 secured to the lever 1. When the latter is in the position shown, the tension on spring 23 is such as to be greater than on spring 21 and to tend to throw lever 7 into the position opposite to that shown, but it is unable to do this because of the tension on spring 11. If, however, lever 1 is in the opposite direction, against pin 5', spring 23 is relaxed and spring 21 tends to pull lever 7 against pin 9. It will be seen that when the lever 13 is moved down, representing the application of energy to the device, the entire linkage will assume position shown in the drawing. When the lever 13 is relaxed, however, spring 23 will move toggle 7 past center and when lever 13 is again moved downward it will carry lever 7 against pin 9', carrying lever 1 with it against pin 5' as spring 11 is more powerful than spring 3. Relaxation of spring 11, by upward movement 13, will cause spring 21 to swing lever 7 past center again, in the opposite direction, since spring 23 is now relaxed. A new downward movement of lever 13 will cause the linkage to reassume the position shown in the figure. Each downward pull on lever 13 therefore causes the entire linkage to change state, which is what is desired.

Figure 2:
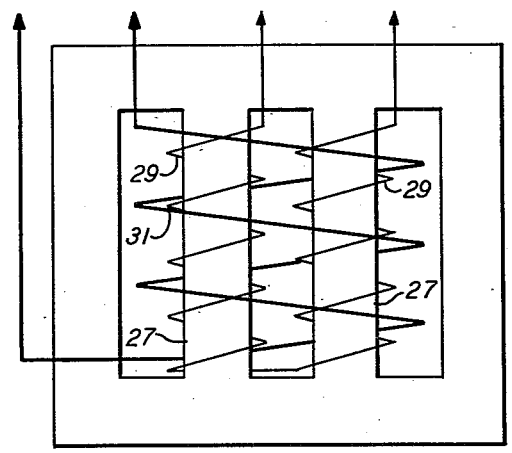
Fig. 2 is a schematic diagram illustrating one form of magnetic toggle such as is illustrated, in still more conventionalized form, in the succeeding figures.
Figure 3:
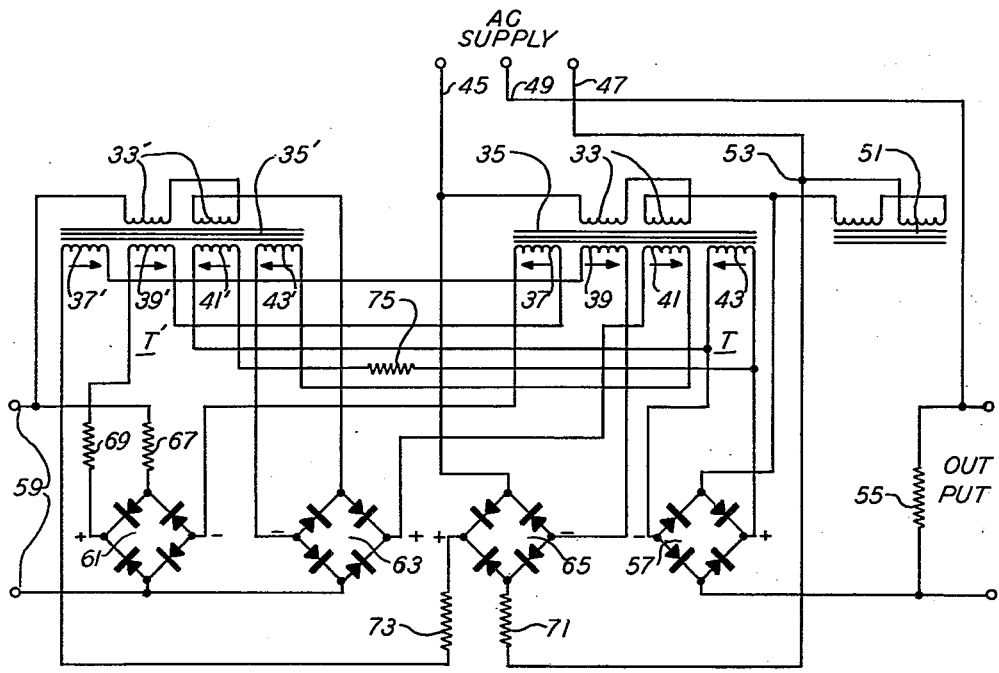
Fig. 3 is a schematic diagram of a single stage magnetic counter in accordance with the present invention.

The electrical toggles illustrated in Fig. 3 are analogous to the mechanical linkage of Fig. 1 if the alternating current supply be taken as the analogue of tension on springs 3 and 11 respectively. The toggles themselves may be any of several known types, the more conventionalized showing of Fig. 3 being representative of any of these types. One such type is shown in Fig. 2. This shows a three-legged core 25, whereof the central or wound leg is divided into two branches 27. In the drawing only two windings are shown on the wound leg; one winding, 29, is wound on the branches 27 individually, and is so connected that a current through it will magnetize the two branches in opposite directions. The second winding 31 encircles both legs, and hence current flowing through it will tend to magnetize both branches in the same direction. If the individual windings to the two branches 27 are balanced, alternating current in either winding will induce no potential in the other, for if it flows in winding 29 the net flux through winding 31 is zero because of the opposite direction of the fluxes in the two branches, while an alternating current flowing in winding 31 will induce voltages in the two halves of winding 29 which buck and therefore cancel out. Theoretically, therefore, it makes no difference which of these windings is used to carry direct current and which to carry alternating current, although convenience may dictate that one or the other be used. A direct current in either winding, however, may so saturate the core that an alternating current in the other cannot materially change the flux. Therefore, when no direct current is flowing in one winding the other exhibits a high impedance to alternating current, whereas if a saturating current flows in one winding the impedance in the other to alternating current drops to substantially the value of its ohmic resistance. The windings may be disposed on separate cores, instead of on a single three-legged core, provided the windings are distributed between the cores, are equally balanced, and the direction of flow through one set of windings is reversed, as between the two cores, with respect to the direction of flow in the others. This, of course, is conventional and well known, and is included here merely as an explanation of the generality of the diagrams used in the later figures. It is obvious that multiple windings of either type may be used, and in the devices illustrated in Figs. 3 and 4 there are a plurality of D. C. windings on each of the electrical toggles. In order to simplify the drawing it is the A. C. windings that are shown as reversed, but this does not indicate that the A. C. windings are non-inductive when considered by themselves, but merely that they are non-inductive with relation to the D. C. windings.

The two toggles comprising the device are generally designated at T and T', and, since they may be substantially identical in so far as the disposition of the windings is concerned, these parts of the electromagnetic circuit are designated by the same reference characters distinguished, in the case of the toggle T', by accents. Taking the toggle T as typical, it comprises an A. C. winding 33 on a core 35, wound in non-inductive relation to four D. C. windings 37, 39, 41 and 43 respectively.

The winding 33 is permanently connected across an alternating current supply. In the particular device shown in Fig. 3 this supply is of the three wire type, comprising terminal leads 45 and 47 and a neutral lead 49, these representing, in a typical case, the terminals and a neutral tap respectively, of a transformer winding. Winding 33 is connected to the leads 45 and 47 in series with a winding 51 of an inductive counterpoise which is so designed as to have an effective impedance equal to that of winding 33 when the latter is in the unsaturated state. With a core of the more usual magnetic materials the counterpoise is preferably substantially a duplicate of the core and winding 33 of the toggle T, but with some of the special alloys used for magnetic amplifiers a simple resistor may give a balance as good or better than an inductor. The junction 53 between winding 33 and the counterpoise is therefore at the same potential as the lead 49 when the toggle T is unsaturated.

The electrical output of the device appears in a bridge circuit connected between these two points, the output voltage appearing across a resistor 55, in series with a full wave rectifier 57. It will be seen that an output voltage will appear only when the bridge is unbalanced through saturation of the core 35, which reduces the inductance of coil 33 to a negligible value.

The input to toggle T' is applied across terminals 59 and is in the form of trains of alternating current waves which may be supplied from any source, including, of course, a potential developed across the output resistor 55 of a preceding stage.

Direct current for exciting the four D. C. coils on each of the cores 35 and 35' is supplied from four full wave rectifiers; the rectifier 57 already referred to, and rectifiers 61, 63, and 65. Rectifiers 61 and 65, respectively, are connected in parallel with the inputs of toggle T' and T respectively; rectifiers 63 and 57 are connected respectively in series with the A. C. windings 33' and 33 of the two toggles. Each rectifier supplies one D. C. winding of each toggle. Rectifier 61, connected in parallel with the input of toggle T' in series with a current limiting resistor 67, feeds direct current through a circuit which may be traced from the positive output terminal of the rectifier through a regulating resistor 69, winding 39', winding 37, and thence back to the negative terminal of the rectifier. This connection is symmetrical with that of rectifier 65, the input of which connects across the supply leads 45 and 47 in series with a current limiting resistor 71, its output circuit being traced from the positive rectifier terminal through regulating resistor 73, winding 37', winding 39, and thence back to the negative terminal of the rectifier. It is to be noted however, that the connection is such that the magnetic effect of the rectified currents is cumulative or boosts in coils 37' and 39' but is subtractive in coils 37 and 39.

Rectifier 63 is connected in series with coil 33' and its output supplies coil 43' and coil 41 in series. The connection is such that the magnetic effect of current flowing in coil 43' bucks that of current flowing in coils 37' and 39'; it is, in fact of sufficient intensity not only to balance the effect of current in these coils but also to overpower it completely and saturate the core in the opposite sense provided the impedance of coil 33' is low, approaching minimum value. If coil 35' is unsaturated, however, and the impedance of coil 33' is accordingly high, the current supplied by rectifier 63 should be of a value which is equal to or a little less than enough to balance out the magnetic effect of the other two coils mentioned, thus maintaining coil 33' at its high impedance value. Rectified current from rectifier 63 therefore acts in a manner similar to that of a toggle spring, tending to maintain the core of the electrical toggle in whichever state it may happen to be. In coil 41 of toggle T these same currents will either saturate core 35 or merely bias it moderately, depending on the state of the core 35'.

Rectifier 57 supplies coils 41' and 43 in parallel but in this case a resistor 75 is included in series with coil 41' to attenuate the current therethrough, whereas no such resistor is included in circuit with coil 43. The sense of the magnetization produced by the current from this rectifier is such that magnetism induced from the coil 41' bucks that produced in coils 37' and 39' and boosts that produced by coil 43' whereas the magnetizing effect of coil 43 bucks that of coil 39 and 41 and bucks that of coil 37. The actual direction of the currents in any of these coils is unimportant, but the relative directions of the magnetizing forces produced thereby is important to this specific embodiment of the invention and is indicated by the arrows shown in the figures immediately below the respective coils. Like the coil 43', with respect to toggle T', coil 43 acts like a toggle spring with respect to the electrical toggle T.

In order to understand the operation of the device the general theory of operation of electrical toggles of this character will first be reviewed, although it has already been set forth in the prior patent above identified. Considering first only the alternating current winding of such a device, say winding 33 of toggle T, plus winding 43 of the same toggle, and assuming for the moment that the core is initially magnetically neutral, it will be seen that when a very low voltage is applied across the input terminals 45, 49, the impedance of coil 33 is high and practically no current is delivered to the D. C. coil 43. If the applied alternating current is gradually raised some slight current will flow through the rectifier until a value is reached where the resultant magnetization produced by coil 43 begins to affect the permeability of the core, dropping the impedance of coil 33, and causing the rectified current to increase to a greater degree than the applied voltage. Continuing to increase the applied voltage, a point will be reached where this action becomes cumulative, decreasing the apparent impedance of coil 33, permitting more current to flow through the rectifier, and thus carrying the core to complete saturation and reducing the reactance of coil 33 so that it approaches zero. This effect may take place at a relatively low voltage. If the applied alternating voltage is then reduced, it must be carried to a much lower value than that causing the initial saturation before the effect is reversed. Furthermore, if the alternating supply is interrupted and then restored, even at a value much lower than was initially required to cause the change of state, the residual magnetism left in the core will be sufficient to cause the resumption of the state last existing.

Consider, next, the effect of current in the coil 39. This current is regulated, by resistors 71 and 73, so that it is of much lower value than is necessary to produce saturation. Rectifier 65 is connected effectively in parallel with the A. C. supply and because it is regulated by the series resistors its output current increases nearly linearly with increased voltage. Within limits of the applied A. C. voltage, and assuming that, initially, the effect of the current in coils 39 and 43 balances, the applied voltage can be varied between rather wide limits without causing a change of state even though the applied voltage is considerably higher than would be required to cause saturation were only coil 43 excited. If, however, the current in coil 39 were interrupted with this higher voltage supplied, or if through some external cause, the magnetomotive force from coil 39 were bucked out, the second state would at once be assumed and reestablishment of current through coil 39 would not be sufficient to reestablish the first state, since coil 43 has been postulated to supply sufficient magnetomotive force to saturate the core even in the presence of the opposing magnetomotive force in coil 39. The device as a whole, therefore has the necessary characteristics of an electrical toggle. Toggle T' is similarly arranged, so that it exhibits like characteristics.

In the case of the present device external impulses causing a change of state are supplied by the cross connections between the two toggles. Coils 43' and 39' of toggle T' have the same functions as the similarly numbered coils on toggle T. It will be noted, however, that coil 41 is connected in series with coil 43', and the relative values of ampere turns are so adjusted that when the output current of T' is high the magnetizing of the current in coil 43 is sufficiently neutralized by the current in coil 41 so that it cannot maintain saturation. Similarly, when toggle T' is excited by the application of an input signal, current supplied by rectifier 61 through coil 37 effectively neutralizes the effect of the constant biasing current applied through coil 39. Therefore, when coil 33' exhibits minimum impedance the core 35 is biased only enough to prevent saturation by coil 43 and coil 33 therefore exhibits maximum impedance. When the excitation of toggle T' is interrupted current through coil 37 also ceases to flow, leaving, however, an effective bias due to coil 39 which is sufficient to prevent another reversal.

If a new impulse is now applied to the input of toggle T', under the general principles that have been described above and the mechanism which will be explained below, coil 33' will be in its high impedance state and no material current will be supplied to coil 41 from the rectifier 63. Current will be supplied from rectifier 61, which will balance out the permanent bias applied from the rectifier 65 through coil 39, and since the adjustment has been postulated to be such that the permanent A. C. voltage applied to coil 33 is sufficiently high to cause the core to saturate in the absence of bias, toggle T will immediately assume its saturated state. The result will be maximum output current. Again, upon cessation of the excitation of toggle T', the bias current in coil 39 is not sufficient to cause a change of state. Toggle T is therefore completely under the control of toggle T', always immediately assuming the opposite condition or state from that assumed by the latter.

Toggle T' is supplied with biasing currents from both output and input of toggle T in a slightly different manner. What is desired is that when toggle T' is excited it shall immediately assume the then existing state of toggle T, and, by so doing, cause the latter to change state. Considering first the state of T' wherein the coil 33 of toggle T has high impedance, no current will be flowing in coil 41'. The magnetic effects of the continuous bias supplied from rectifier 65 and the intermittent bias applied from rectifier 61 are cumulative. Coils 37' and 39' jointly provide something over the normal bias which is sufficient substantially to balance the minimum series output current in coil 43'; therefore, when the potential is applied to the toggle T', it assumes the minimum output state existing in toggle T at the instant of application and in so doing causes toggle T immediately to change state as has already been described.

The reversal of state of toggle T causes current to flow in winding 41, but this is adjusted by means of resistor 75 so that it is of the same order of magnitude, in so far as magnetizing effect is concerned, as the current in either coil 37' and 39'. It is not sufficient to overcome the magnetic bias of coils 37' and 39' and upset the established state of toggle T' as long as the latter continues to be energized. When input to toggle T' is interrupted, however, a continuing bias in coil 41' is sufficient to overcome that supplied by coil 37' alone and thus set up a predilection in toggle T' to assume a maximum output state when the input current is interrupted and reapplied, this tendency being, of course, fortified by the small current in coil 43' when the reapplication occurs. Accordingly the net bias at the instant of reapplication of potential to toggle T' is insufficient to prevent core 35' saturating and upon such reexcitation the toggle therefore assumes its maximum output state and thereby trips toggle T, causing it to assume its state of minimum output, whereafter the cycle repeats.

Each reapplication of power to the input terminals 59 therefore causes a reversal of state in the output resistor 55 and in any other stage connected across it, which is the situation desired. This is true, however, only so long as the potential is continuously applied across the terminals 45—47. If all excitation is removed from the system and then reapplied the residual magnetization left in all of the cores is such that the entire counter or cascade of counters reestablishes the condition existing when the overall excitation was withdrawn.

The positiveness and speed with which the above actions occur depends upon the characteristics of the magnetic material and upon the amount of the latter in the individual toggles, the action speeding up as the weight of the magnetic material is decreased. The better materials for the purpose have high initial permeability and therefore exhibit a high inductance when excited by relatively small currents, but saturate rapidly when those currents are increased above a certain limiting value. With the best of such materials the impedance of the coils 33 and 33' may be so high when unsaturated that the residual current may be neglected, in which case the three wire supply for the toggle T and the counterpoise arrangement for cancelling the effect of the residual current may be omitted. With these materials the transitions between states are more rapid, and their high frequency characteristics are better. Using such materials the counting speed may be of the same order as may be attained with the usual types of Eccles-Jordan flip-flop counters.

It must be realized that there is fairly wide latitude in the amount of magnetic bias that can be applied to the cores without causing a change of state. When the biased toggles are in their minimum output or unsaturated condition an increase in current in the output coils causes a decrease in saturation and is therefore self-limiting; i. e. the state is truly stable. Where the output current is high it is enormously greater than when the device is in the minimum output condition, the currents differing by actual orders of magnitude, and therefore, once the bias is overcome, this state too is completely stable. Indeed, if the coils 43, 43' have the same number of turns as the biasing coils 37 or 39, extremely large tripping magnetizations might be required and the series resistance of these coils might materially reduce the effective output voltages available. It is therefore much more economical to make the series coils of relatively few turns having relatively high current carrying capacity.

The adjustments therefore need not be particularly critical. The most critical adjustment is that of the current in coil 41', which must not be sufficient to trip toggle T' when toggle T trips, but merely sufficient to insure that when excitation is reapplied to toggle T' the tripping is in the proper direction.

Where the more ordinary types of magnetic materials are used, so that the minimum output current is so large that it cannot be neglected, various means are available for balancing it out beside the three wire counterpoise method shown in Fig. 3. For example several such methods are shown in an article by the present inventor published in the AIEE Transactions, vol. 71, 1952.

Figure 4:
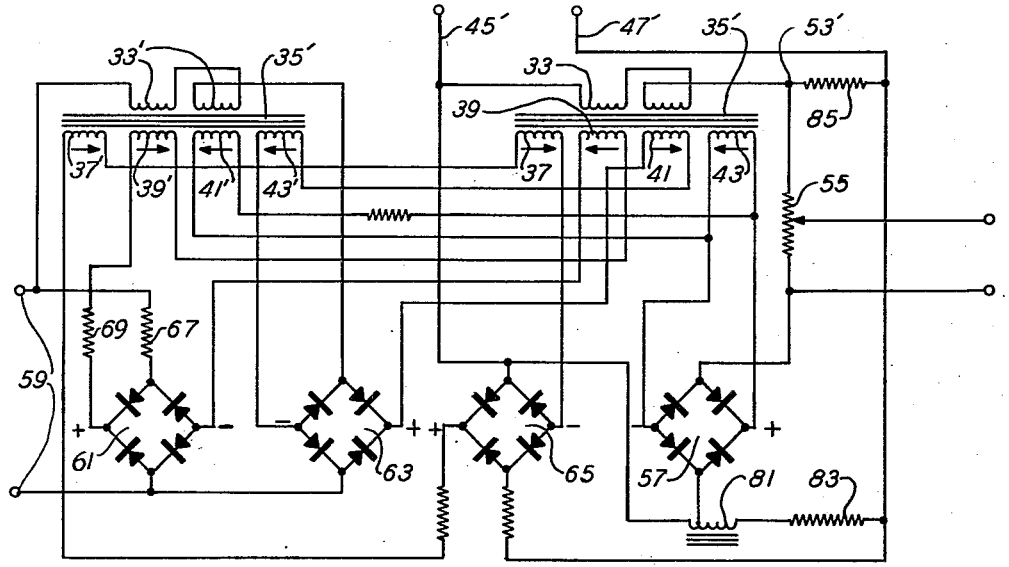
Fig. 4 is a similar diagram illustrating a modified form of magnetic counter utilizing a different type of neutralization of the residual current which may flow in the output of a magnetic counter when certain types of magnetic materials are employed as the cores thereof.

The diagram of Fig. 4 is in most respects identical with that of Fig. 3, and the elements of the toggles T and T' are indicated by the same reference characters. The circuit differs, however, in the method used to cancel out the effect of the residual or quiescent current passed by the A. C. input coils 33 when the core 35 is in the unsaturated condition. This is one of the methods fully described and illustrated in the AIEE article above noted.

In this case the leads connecting from the supply to the toggle T are designated as 45' and 47'. Rectifier 57, in series with the output resistor 55 and the input to toggle T, is connected to a tap on an impedance 81 which connects from the supply lead 45' through a resistor 83 to supply lead 47'. The A. C. circuit connects from this tap through the rectifier 57, output resistor 55, and the input coil 33 back to lead 45'. A resistor 85 connects from the lead 47' to the junction point 53' between the coil 33 and the resistor 55. There is one other variance shown in this figure from the connections illustrated in Fig. 3 in that the output circuit is shown connected to a variable tap and resistor 55. Either connection can be used, but that shown in Fig. 4 is of assistance in balancing operations when the counters are connected in cascade.

Reverting to the primary difference in the two figures, resistor 85 bears a similar ratio to the unsaturated impedance of coil 33 as does resistor 83 to the impedance of coil 81, so that resistor 55 is in effect connected across the diagonal and balanced bridge when toggle 35 is unsaturated. To attain a desired balance resistor 85 has a fairly high value so that the losses through it are small whereas resistor 83 has a lower value since it is, in effect, in series with the main input circuit of the toggle. The coil 81 acts as an auto-transformer, so that by balancing the tap upon it and by varying the value of resistor 83 substantially the optimum voltage relationship may be attained while still preserving balance in the output circuit.

Fig. 5 is a block diagram showing the method of connecting either of the two arrangements illustrated in Fig. 3 or 4 in cascade, the only difference being that in the particular case shown the two-wire A. C. supply circuit is used. A. C. supply leads are therefore designated as 45' and 47' to correspond with the notation of Fig. 4. The three counting circuits are designated respectively as circuits A, B, and C, and the toggle T and T' for each of the counters are designated by corresponding subscripts. The toggles themselves are represented merely as blocks, with interconnections between the blocks indicated by the arrowheads as feeding in both directions between the toggles to indicate the cross-coupling. Toggles $T_a$, $T_b$ and $T_c$ are connected in parallel to the common A. C. supply leads 45' and 47'. The input signals to be counted are shown as being fed to toggle $T'_a$ as shown in the schematic figures. The output impulses, of half the repetition frequency of those fed to counter A, appear across resistor $55_a$ and are fed from a tap to the input of counting circuit B. Similarly output signals of one-half the repetition frequency of those fed to its input appear across the resistor $55_b$ and the process is repeated in counting circuit C. As many more stages as may be desired may be connected in cascade from this latter output resistor, as is common practice in binary counters. Which of the two possible stable states is momentarily assumed by any of the counters in the chain may be indicated in any manner desired, for example, by small neon lamps 91a, 91b and 91c connected across the corresponding resistors 55, these lamps indicating "zero" when extinguished and "1" when lighted, as is conventional with counters of the vacuum type.

The magnetic amplifiers shown and described herein are of the separately-biased type, this type having been chosen for illustration in the belief that the operation of the invention can be more readily understood if the various component currents which contribute to the operation flow in independent circuits. It is now well understood that in general the functions of such amplifiers can be duplicated by self-saturating magnetic amplifiers, and this is true in the present instance. For the purposes of this invention the two general types are full equivalents, and the modifications necessary to adapt the self-saturating type of amplifier will be apparent to those skilled in the art.

It should be noted particularly that as used in this specification the term "A. C. supply" does not connote that this supply is necessarily or even usually the 60 cycle supply conventional for power distribution. The rate at which counting can be accomplished by the device of this invention is almost directly proportional to this supply frequency. As noted above, the mass of the core required is an inverse function of the frequency, and the winding required likewise decreases with increasing frequency. It has also been noted that there is a wide variation in the type of toggles that may be employed. The detailed description used herein for illustrative purposes is therefore not intended to be a limitation upon the scope of the invention disclosed herein, except as such limitations are expressed in the following claims.

I claim:

1. A binary counter comprising a first and a second electrical toggle each having two stable operating states, the two states of each giving different characteristic output energy, means for supplying actuating energy continuously to said first electrical toggle, means for supplying intermittent trains of actuating energy to said second electrical toggle, said trains being representative of the events to be counted, means responsive to the output energy of said second electrical toggle for controlling the operating state of said first electrical toggle, and means responsive to the output energy of said first electrical toggle for biasing said second electrical toggle toward the opposite operating state from that momentarily exhibited thereby to an extent less than that required to cause a change of state while said second electrical toggle is energized, whereby said second toggle assumes said opposite state when the actuating energy supplied thereto is intermitted and re-established.

2. A binary counter comprising a first and a second electrical amplifier each including feedback means adapted to cause it to assume when energized one or the other of two stable operating conditions characterized by different output energies, means for applying actuating energy continuously to said first amplifier, means for applying actuating energy intermittently to the second of said amplifiers, such intermittent applications of energy constituting the events to be counted, means responsive to the output of sair first amplifier for controlling the state assumed by said second amplifier, and means supplied by the output of said second amplifier for biasing said first amplifier toward the stable state opposite to that momentarily assumed thereby to an extent less than required to cause said second amplifier to assume said opposite state when energized, thereby causing said second amplifier to assume said opposite state when the actuating energy supplied thereto is intermitted and reapplied.

3. A counting circuit comprising a first and a second magnetic amplifier each including a saturable core, input windings on said core and means for magnetically biasing said core to provide two stable operating states characterized by different output currents when said input windings are supplied by alternating actuating currents, connections for supplying the input windings of said first amplifier with a continuous train of alternating current waves, means for supplying the input winding of said second amplifier with intermittent trains of alternating current waves constituting the events to be counted, means supplied by the output of said second amplifier for controlling the stable state assumed by said first amplifier, and means supplied by said first amplifier for biasing said second amplifier toward the opposite stable state than that momentarily assumed thereby to a less degree than necessary to cause a change of state of said second amplifier when supplied with said alternating current.

4. A magnetic binary counter comprising a first and a second magnetic amplifier each comprising a saturable core and windings on said core designated as windings (a) through (e) as follows: (a) an alternating current input winding; (b) a biasing winding connected to be supplied in parallel with the input winding of said first amplifier; (c) a biasing winding connected to be supplied in parallel with the input winding of said second amplifier; (d) a biasing winding connected to be supplied in series with the input winding of said first amplifier, and (e) a biasing winding connected to be supplied in series with the input winding of said second amplifier; means in circuit with each of said biasing windings for rectifying the current supplied thereto; said rectifying means being respectively so poled as to excite windings (b) and (d) of each of said amplifiers in opposite senses; windings (c) and (e) of each amplifier in opposite senses, windings (b) and (c) of said second amplifier in the same sense; connections for applying a continuous train of alternating current waves to the input winding of said first amplifier, connections for applying intermittent trains of alternating current waves to said second amplifier, and means determinative of the relative magnitudes of the biasing currents in said biasing windings to values such that simultaneous maximum excitation of any two opposing windings of said first amplifier produces a substantially cancelled resultant bias whereas maximum excitation of any single biasing winding produces substantial saturation of the core thereof, maximum simultaneous excitation of windings (b) and (e) or (c) and (e) of said second amplifier produces a substantially cancelled resultant bias whereas maximum excitation of any one of said windings produces a substantially saturating bias, and maximum excitation of winding (d) of said second winding is of less magnitude than that required to produce either desaturation when an opposed winding is excited to maximum or saturation when individually excited.

5. A counter as defined in claim 4 including load connections in series with the input winding of said first amplifier and means for effectively balancing out potentials across said load connections when the core of said first amplifier is unsaturated.

6. A counter in accordance with claim 5 wherein the connections for supplying the input winding of said first amplifier comprise a three wire system including terminal connections of opposite phases, and a neutral, the input winding of said first amplifier being connected between one of said terminal connections and said neutral, a counterpoise reactor having a reactance substantially equal to the reactance of said input winding when the core thereof is unsaturated, and said load connections being included.

References Cited in the file of this patent

UNITED STATES PATENTS

| 1,824,577 | Sorensen | Sept. 22, 1931 |
| 2,519,513 | Thompson | Aug. 22, 1950 |
| 2,640,164 | Giel | May 26, 1953 |
| 2,666,151 | Rajchman | Jan. 12, 1954 |